United States Patent
Burgaud et al.

(10) Patent No.: US 11,964,896 B2
(45) Date of Patent: Apr. 23, 2024

(54) BENDING OF GLASS SHEETS COMPRISING LOCALIZED COOLING

(71) Applicant: SAINT-GOBAIN GLASS FRANCE, Courbevoie (FR)

(72) Inventors: David Burgaud, Candor (FR); Alexandre Hennion, Katowice (PL); Jérôme Gobin, Saint Leger Aux Bois (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 141 days.

(21) Appl. No.: 16/624,570

(22) PCT Filed: Jun. 26, 2018

(86) PCT No.: PCT/FR2018/051558
§ 371 (c)(1),
(2) Date: Dec. 19, 2019

(87) PCT Pub. No.: WO2019/002751
PCT Pub. Date: Jan. 3, 2019

(65) Prior Publication Data
US 2020/0216349 A1 Jul. 9, 2020

(30) Foreign Application Priority Data

Jun. 29, 2017 (FR) ...................................... 1700693

(51) Int. Cl.
*C03B 23/02* (2006.01)
*C03B 23/023* (2006.01)
(Continued)

(52) U.S. Cl.
CPC ...... *C03B 23/0235* (2013.01); *C03B 23/0307* (2013.01); *C03B 27/0404* (2013.01);
(Continued)

(58) Field of Classification Search
None
See application file for complete search history.

(56) References Cited

U.S. PATENT DOCUMENTS 2,861,396 A * 11/1958 Richardson ........... C03B 23/027
65/291
2,897,632 A 8/1959 Fowler et al.
(Continued)

FOREIGN PATENT DOCUMENTS

BE 723 484 A 5/1969
CN 102741190 A 10/2012
(Continued)

OTHER PUBLICATIONS

Office Action as issued in Chinese Patent Application No. 201880002120.1, dated Apr. 8, 2021.
(Continued)

*Primary Examiner* — Jodi C Franklin
(74) *Attorney, Agent, or Firm* — Pillsbury Winthrop Shaw Pittman LLP (57) ABSTRACT

A device and a process for manufacturing a bent individual glass sheet including a peripheral compression belt, wherein the process includes the heating thereof to its bending temperature in a furnace, the individual bending thereof, and the general cooling thereof. One zone of the sheet at least partially inside the peripheral compression belt, referred to as locally cooled zone, undergoes, after the heating of the sheet, a local cooling faster than the general cooling, when the sheet is at a temperature of at least 530° C. The cutting of the sheet on the locally cooled zone creates edges having edge compressive stresses.

12 Claims, 5 Drawing Sheets

(51) Int. Cl.
*C03B 23/03* (2006.01)
*C03B 27/04* (2006.01)
*C03B 27/044* (2006.01)
(52) U.S. Cl.
CPC ........ *C03B 27/0413* (2013.01); *C03B 27/044* (2013.01); *C03B 2225/02* (2013.01)

(56) References Cited

U.S. PATENT DOCUMENTS

| | | | | |
|---|---|---|---|---|
| 3,084,526 A | * | 4/1963 | Richardson | C03B 29/08 65/268 |
| 3,279,906 A | * | 10/1966 | Baker | C03B 27/052 65/275 |
| 4,124,367 A | | 11/1978 | Reese et al. | |
| 4,756,735 A | * | 7/1988 | Cathers | C03B 23/027 65/273 |
| 4,826,522 A | * | 5/1989 | d'Iribarne | C03B 27/0413 65/351 |
| 4,865,638 A | * | 9/1989 | Kudo | C03B 23/035 65/273 |
| 4,983,205 A | * | 1/1991 | Kuster | C03B 23/0302 65/290 |
| 5,053,069 A | * | 10/1991 | Vanaschen | C03B 23/03 65/288 |
| 5,071,461 A | * | 12/1991 | Hirotsu | C03B 23/0258 65/273 |
| 5,114,454 A | * | 5/1992 | Promper | C03B 23/023 65/163 |
| 5,178,660 A | * | 1/1993 | Wampler | C03B 23/0305 65/273 |
| 5,330,550 A | * | 7/1994 | Kuster | C03B 23/03 65/289 |
| 5,441,551 A | * | 8/1995 | Ollfisch | C03B 23/0307 65/374.13 |
| 5,472,470 A | * | 12/1995 | Kormanyos | C03B 27/0413 65/374.13 |
| 5,679,124 A | * | 10/1997 | Schnabel, Jr. | C03B 23/0252 65/115 |
| 5,735,922 A | * | 4/1998 | Woodward | C03B 23/033 65/104 |
| 5,972,513 A | * | 10/1999 | Yoshizawa | C03B 27/048 428/428 |
| 5,992,180 A | * | 11/1999 | Tsuchiya | C03B 23/0252 65/102 |
| 6,412,309 B1 | * | 7/2002 | Kajii | C03B 27/048 65/351 |
| 6,613,943 B2 | * | 9/2003 | Kim | C07C 235/24 564/223 |
| 9,061,934 B2 | | 6/2015 | Bisson et al. | |
| 9,550,695 B2 | * | 1/2017 | Immerman | C03B 23/0235 |
| 2002/0116951 A1 | * | 8/2002 | Dunifon | C03B 23/0307 264/225 |
| 2005/0061034 A1 | * | 3/2005 | Boisselle | C03B 23/0357 65/169 |
| 2005/0268661 A1 | | 12/2005 | Yoshizawa et al. | |
| 2010/0190001 A1 | * | 7/2010 | Barton | B32B 17/10174 65/60.2 |
| 2011/0272974 A1 | | 11/2011 | Labrot et al. | |
| 2014/0230493 A1 | * | 8/2014 | Balduin | C03B 23/0357 65/106 |
| 2014/0234576 A1 | * | 8/2014 | Berard | C03B 27/0413 296/216.01 |
| 2014/0252808 A1 | * | 9/2014 | Hennion | B32B 17/10036 428/137 |
| 2015/0236491 A1 | | 8/2015 | Bureloux et al. | |
| 2015/0283797 A1 | | 10/2015 | Hennion et al. | |
| 2015/0315058 A1 | * | 11/2015 | Ota | C03B 27/0404 65/268 |
| 2017/0314321 A1 | * | 11/2017 | Berard | C03B 33/078 |
| 2018/0186681 A1 | * | 7/2018 | Dechirot | C03B 23/03 |
| 2018/0297886 A1 | * | 10/2018 | Thomas | C03B 23/0235 |
| 2018/0362386 A1 | * | 12/2018 | Betschart | C03B 23/0355 |
| 2019/0127260 A1 | * | 5/2019 | Palmantier | C03B 40/005 |
| 2020/0325057 A1 | * | 10/2020 | Burdette | C03B 23/0252 |
| 2022/0371935 A1 | * | 11/2022 | Poissy | C03B 23/0357 |

FOREIGN PATENT DOCUMENTS

| | | | |
|---|---|---|---|
| CN | 103764390 A | 4/2014 | |
| EP | 1826186 A2 * | 8/2007 | ........ C03B 23/0252 |
| EP | 3145881 A1 * | 3/2017 | ........ C03B 23/0235 |
| FR | 2 828 880 A1 | 2/2003 | |
| GB | 1 157 391 A | 7/1969 | |
| GB | 1 289 488 A | 9/1972 | |
| JP | 05170468 A * | 7/1993 | ........ C03B 35/202 |
| RU | 2137723 C1 | 9/1999 | |
| SU | 1384547 A1 | 3/1988 | |

OTHER PUBLICATIONS

Office Action as issued in Indian Patent Application No. 202017001350, dated Jan. 11, 2021.
International Search Report as issued in International Patent Application No. PCT/FR2018/051558, dated Aug. 29, 2018.
Office Action and Search Report as issued in Russian Patent Application No. 2020102028/03(002978), dated Sep. 24, 2021.

* cited by examiner

BENDING OF GLASS SHEETS COMPRISING LOCALIZED COOLING

CROSS-REFERENCE TO RELATED APPLICATIONS

This application is the U.S. National Stage of PCT/FR2018/051558, filed Jun. 26, 2018, which in turn claims priority to French patent application number 1700693 filed Jun. 29, 2017. The content of these applications are incorporated herein by reference in their entireties.

The invention relates to the field of bent glazing, in particular motor vehicle glazing, comprising zones strengthened by compressive stresses.

The creation of zones strengthened by compressive stresses on a glazing may be rendered necessary for certain uses. In particular, it is recommended that an orifice in a glazing have high enough edge stresses to offer sufficient resistance, for example if the cable must pass through it or if a part must be fixed around it.

Documents GB 1157391 and BE 7234484 teach a differentiated tempering of the glass in order to obtain a different breakage behaviour in the central zone, without envisaging the cutting of the glass. Document U.S. Pat. No. 5,972,513 teaches a laminated glass, one sheet of which is hardened, without envisaging the cutting thereof. As other documents, mention may be made of US 2005/0268661 and FR 2828880.

A process of bending glass sheets in pairs does not always make it possible to achieve all the necessary product performances, in particular in the case of encapsulated roofs, in particular with regard to dimensional tolerances, optical qualities in reflection and surface stresses. In certain cases, it is therefore preferable to bend the glass sheets individually.

The invention firstly relates to a "sheet by sheet" bending process, which means that the sheets are bent individually, i.e. one by one and not in a stacked manner. Several sheets bent by the process according to the invention may optionally then be assembled to form a laminated glazing. A sheet bent according to the invention may also be assembled with a sheet bent by a process different from the one according to the invention. A sheet bent according to the invention may also be used individually without being assembled with another one.

The invention relates to a device and a process for manufacturing a bent individual glass sheet comprising a peripheral compression belt, comprising the heating thereof to its bending temperature in a furnace, the individual bending thereof, and the general cooling thereof, one zone of the sheet at least partially inside said peripheral compression belt, referred to as locally cooled zone, undergoing, after the heating of the sheet, a local cooling faster than the general cooling, when the sheet is at a temperature of at least 530° C. In the furnace, the sheet is conveyed and heated individually. The sheet undergoes the local cooling individually. The local cooling generates in said zone and during the general cooling of the sheet, stresses in the thickness thereof.

The locally cooled zone separate from the peripheral zone comprising the peripheral compression belt after the general cooling of the sheet. The compression belt is formed in a manner well known to person skilled in the art owing to the general cooling and without the use of a specific cooling means at the peripheral zone. The locally cooled zone is at least partially in the region of the sheet inside the compression belt, which encompasses the fact that the locally cooled zone can partly overlap the compression belt zone. However, preferably, any encroachment between locally cooled zone and the compression belt is avoided. Specifically, although the local cooling produces a compression zone, this compression zone is immediately followed by a tension zone. Yet it is desired to prevent this tension from reducing the compression of the compression belt, since then the edge would be locally less strengthened than the rest of the compression belt. A compression belt extends from the edge of the glass to a distance from the edge of the glass generally of at least 2.5 mm and that may extend up to 10 mm. This is in particular why, preferably, the locally cooled zone is at a distance from the edge of the glass of greater than 1.5 cm (this distance is the distance between the edge and the start of the locally cooled zone). Preferably, the locally cooled zone is at a distance from the edge of the glass of greater than one times the diameter of the locally cooled zone and preferably of greater than 1.3 times the diameter of the locally cooled zone (here also, this distance is the distance between the edge and the start of the locally cooled zone). The term "diameter" is understood to mean the equivalent diameter, that is to say the diameter of a circle of the same area. Generally, the locally cooled zone covers an area of less than 10% and even of less than 5% of the area of a main face of the glass sheet, it being understood that in the case of ring cooling, the area inside the ring is counted.

According to the invention, with a view to the bending thereof, the sheet is heated to its bending temperature, i.e. its plastic deformation temperature, it being possible for this heating to bring it to a temperature between 590° C. and 660° C.

According to the invention, the sheet undergoes a localized cooling that is the origin of stresses in the thickness of the cooled final sheet. These stresses are generated in the zone of the sheet that has undergone the local cooling. This localized cooling may be carried out either in a hot environment, in particular directly following the heating zone of the furnace, or in a cold environment. In the case of a hot environment, the glass is in a chamber (final zone of the furnace or chamber immediately following the furnace), the atmosphere of which is at a temperature between 400° C. and 650° C. In a cold environment, the glass is in a factory workshop environment, the atmosphere of which is at a temperature generally between 5° C. and 50° C. In all cases, the localized cooling is administered on the sheet when this sheet is in an environment at a temperature lower than that of the sheet.

The bending tool is located after the sheet heating zone. The bending tool may itself be in a hot environment, the temperature of which is generally within the range extending from 400° C. to 650° C. or in a cold environment, the temperature of which is generally within the range extending from 5° C. to 50° C. In the latter case (cold environment), the bending is carried out after the removal of the sheet from the furnace and generally outside of any chamber. Bending in a hot environment is preferred for parts of very complex shape with regard to their curvatures or that require a particularly high degree of tempering. Specifically, tempering administered by blowing cold air onto a sheet directly leaving a hot environment leads to a high degree of tempering.

In all cases, the bending tool, in particular an upper bending form, whether it is in a cold environment or in a hot environment, is generally at the temperature lower than the temperature of the sheet arriving to be bent.

The local cooling is carried out so as to introduce a temperature differential at the latest while the stresses in the glass are being determined and preferably already before the stresses in the glass are determined. This temperature differential is a temperature difference between the zone that has undergone the local cooling (referred to as "locally cooled zone") and which is rendered colder, and the region which immediately adjoins at and which remains hotter.

The local cooling is administered on the sheet when the latter is at a temperature of at least 530° C., in particular at a temperature within the range extending from 530° C. to 660° C. and preferably within the range extending from 550° C. to 610° C. These are temperatures just before the administration of the local cooling. If the local cooling is administered while the glass is outside of any chamber, in a cold environment therefore, it is generally administered while the glass is at a temperature within the range extending from 530° C. to 580° C. The local cooling is applied during the general cooling. Which generally begins after the heating of the sheet to its bending temperature.

It is acknowledged that the temperature differential is not lost until the setting of the glass, which generally occurs at the latest in the vicinity of 530° C.

For carrying out the local cooling in a hot environment, the local cooling is carried out when the glass is in a chamber, which is optionally part of the furnace, or which is separate from the furnace and follows the furnace immediately for the glass. The hot environment zone follows on, for the glass, from the zone for heating the glass in the furnace. The hot environment zone does not comprise heating elements for the glass. In this hot environment zone, the glasses that a hotter temperature than the temperature of the atmosphere that surrounds it. The glass is not heated after administration of the local cooling.

The locally cooled zone (in particular covering an area of between 0.5 cm² and 70 cm²) must remain colder than the region which immediately adjoins it, until the glass is sufficiently cooled (around 530° C.) so that it is set and so that its internal stresses are determined. The local cooling may be administered on the chosen zone of the glass as soon as the heating to its bending temperature has ended, before the bending and/or during the bending and/or after the bending. The local cooling may be administered on one main face or both main faces of the sheet, and if it is administered to both faces the local cooling on one face may or may not be opposite the local cooling on the other face. A cooling on both faces of the sheet and which is opposite produces a more intense localized cooling.

The general cooling of the sheet is continual (i.e. the temperature drops in a uniform manner) as soon as it has passed the last heating elements in the furnace.

The local cooling may be obtained by convection, conduction, radiation, or a combination of these means. Convective local cooling according to which air, generally at a temperature between 0° C. and 50° C., is blown onto the chosen zone is very suitable.

The zone affected by the local cooling may be a strip several millimeters wide and having any shape. It shape may be that of a line on which cutting could subsequently be carried out. After cutting, the two edges formed by the cut have edge compressive stresses that strengthen them. Preferably, the local cooling is sufficient in duration and intensity so that the edge compressive stresses after cutting in the locally cooled zone are greater than 4 MPa and preferably greater than 8 MPa. Routine tests easily enable this adjustment. Preferably, the local cooling is administered for the local compressive stress to be less than 20 MPa.

The whole of the sheet undergoes a general cooling as soon as the heating thereof has ended, in particular the sheet has left the furnace, and its edges cool more rapidly than the rest of the sheet. This is why the peripheral edge of the sheet naturally comprises edge stresses due to the general cooling without it generally being necessary to blow on it. Thus, the sheet comprises a belt of compressive edge stresses of greater than 4 MPa and preferably greater than 8 MPa. These peripheral edge stresses are desired since the peripheral edges of the sheet are more likely to be subjected to impacts and the central zone of the main surfaces. The local cooling according to the invention is added, for a given zone, to the general cooling of the sheet. The local cooling is faster than the general cooling for the locally cooled zone.

The invention also relates to a process for manufacturing a bent glazing comprising a glass sheet comprising a peripheral compression belt and an orifice at least partially inside the peripheral compression belt, said orifice having an edge compressive stress of at least 4 MPa and preferably of at least 8 MPa, comprising the preparation of the glass sheet by the process according to the invention comprising the local cooling, followed by the cutting of the orifice in the locally cooled zone.

Within the context of the present application, the compressive stress values are determined by the method described in the standard ASTM F218-2005-01. Generally, the edge compressive stress values are determined between 0.1 and 2 mm from an edge and preferably between 0.5 and 1 mm from an edge. For the case where a local compressive stress zone does not surround an orifice insofar as it is a zone that allows the possibility of creating an orifice subsequently, then the stress value can be determined after cutting followed by the measurement of the stress at the distance from the edge as has just been indicated.

For the case where the local cooling is administered with a view to creating an orifice, the locally cooled zone may affect only the cutting line or the whole of the zone removed by cutting. For example, if the future orifice is circular, and when the local cooling is administered by an air blowing nozzle, the orifice of the nozzle may have the shape of a disk or that of a ring. In the case of a disk, the diameter of the disk is slightly greater than that of the circle to be cut and it is the entire surface inside the circle which undergoes the local controlled cooling. In case of a ring-shaped nozzle, the latter blows over a ring-shaped zone on the circle and not inside this ring. For an identical cooled zone diameter, it is preferred to locally cool a ring-shaped zone compared to a disk-shaped zone since this is less expensive from an energy point of view. Furthermore, as a compression inevitably leads to a tension in a neighboring region, the more the area of the cooling zone and therefore the area of the compression zone is reduced, the more the area of the neighboring tension zone is reduced. The reduction of the area of the tension zone is favorable for the robustness of the glass. This is a significant reason why ring cooling rather than disk cooling is preferred, since a ring has a smaller surface area than a disk of the same outer diameter, and the tension created will be smaller. Furthermore, for the case where the cooling is administered by conduction (i.e. by contact), it is easier to ensure contact as a ring rather than as a disk on bent glass.

A ring-shaped nozzle is used more for the largest orifices. A circular or non-circular orifice may have an area of between 0.5 cm² and 70 cm². In this case, the locally cooled zone covers an area of between 0.5 cm² and 70 cm², whether the cooling has been applied as a ring (the area also covers the zone inside the ring) or as a disk, and so as to enable the cutting of an orifice having an area of between 0.5 cm² and 70 cm², said orifice having an edge that has a compressive stress of at least 4 MPa and preferably of at least 8 MPa. Preferably, the cutting is carried out on the locally cooled zone, i.e. the zoning compression, so as to leave an edge in compression after the cutting. The area of the locally cooled zone (including where appropriate the inside of the ring) is therefore preferably larger than the area of the cut zone. Relative to the outer contour of the locally cooled zone, a contour of the cut zone is preferably at at least 0.5 mm and preferably at at least 1 mm from the edge of the locally cooled zone, which zone is under compression, and inside this zone.

A sheet obtained according to the invention may be cut at ambient temperature on the locally cooled zone. It may be cut before fitting to a vehicle or after fitting to a vehicle. For example, it may be a zone that can be drilled to allow a roof bar support to pass through and the choice of cutting the sheet or not may be left up to the owner of the vehicle.

Several sheets obtained by the process according to the invention may be assembled as a laminated glazing. This assembling is carried out in a manner well known to person skilled in the art by inserting a sheet of polymer material between the two glass sheets. Generally, the locally cooled zones having are opposite in the laminated glazing. In this case, an orifice passing through the entire laminated glazing may be made by cutting after the assembly thereof. It is possible to cut the laminated assembly starting from just one of its main faces or from both of its main faces at the same time by one of the following means:

hole saw or router: preferably both main faces are cut at the same time,
waterjet: a single side suffices.

It is also possible to assemble, as a laminated glazing, a sheet that has undergone a localized cooling according to the invention with a sheet that has not undergone localized cooling according to the invention. In this case, if a cut is made it generally only affects the sheet that has undergone the cooling, the other sheet not being cut. This cutting may for example be used to house an element such as vehicle interior lighting, the laminate serving for example as the roof of said vehicle.

It is advantageous to be able to cut the glass after the bending since the shape given by the bending is not influenced by the orifice at the subsequently cut location. Specifically, if an orifice is cut before bending, the shape of the glass may have defects at the orifice. The existence of an orifice during the forming has an influence on the optical appearance in reflection and an optical distortion is observed in the area around the orifice. Furthermore, in the case of the assembly, as a laminar, of several sheets cut before assembly (prior art), comprising for example an orifice, an offset between the glasses may exist at the orifice due to an imperfect alignment of the glasses at the time of the assembly. Furthermore, the presence of the orifice at the time of the forming increases the technical complexity for the feasibility of the product, which has an impact on the efficiency of the furnace and on the feasibility of the glazing. These difficulties are greater in the following cases:

creation of several holes,
large size of the hole,
if the hole has a linear side (square or rectangular shape for example),
if the hole is in a highly bent zone.

According to the invention, cutting the glass after assembly as a laminate solves this problem of poor alignment since the various sheets of the laminar can be drilled at the same time. Thus, according to prior art, it operations necessary for each sheet and for the interlayer made of polymer material (generally made of PVB). According to prior art, cutting the polymer material specifically requires an additional operation and, furthermore, in order to guarantee the degassing during the assembly of the laminate, an additional operation is necessary with the installation of an element (suction cup, bag, green snake, etc.) that makes possible to seal the hole during the degassing operation. On the contrary, according to the present invention, a conventional assembly is carried out then a single drilling operation is needed for the entire laminate. The orifice thus made is perfectly continuous through the laminate whereas according to the prior art (one drilling per sheet before assembly), the tolerances are increased by the addition of the tolerances of the various drillings.

The local cooling that generates stresses in the glass may also be carried out without it necessarily being envisaged to cut it in this zone. Indeed, it may be desired to produce a laminated glazing with an additional element inserted into the glazing, at the interlayer made of polymer material (such as PVB) between two assembled glass sheets. This may be an element that has a lighting function and that comprises for example and LED or OLED, or else a sensible receiver or detector or a simple esthetic element. This integration into the glazing may specifically lead to the breaking thereof. A local reinforcement according to the invention improves the robustness of the glass at the location chosen to position this additional element and enables this integration. Furthermore, if the glazing must be highly mechanically stressed at a given location, for example because it must receive an opening or closure system, or a handle, then the local reinforcement according to the invention secures the solidity of the glass that the chosen location.

For the case where several individually bent sheets are assembled in a laminate, preferably sheets that immediately follow one another in the bending process are assembled so that any possible drift in the process has the least possible influence on the shape of the various sheets to be assembled. If a sheet without localized cooling and a sheet with localized cooling must be assembled, these two sheets are made to immediately follow one another, the only difference being that the cooling is carried out for one sheet and not for the other.

The sheets pass one after the other through a bending step then a cooling step. The bending process may be of any type, in particular by sag bending or by press bending. In all cases, in an industrial process, the individual sheets are conveyed one behind the other and preferably on a roller bed up to the bending tool for the individual bending of the sheets. For the case where the bending tool comprises an upper bending form, the roller bed carries the sheet until it is under said form. Thus, during the process according to the invention, the sheet is conveyed and heated individually in the furnace, then bent individually. The sheet undergoes the local cooling while it is in the individual state. In particular, this local cooling may be applied before the bending. In particular, this local cooling may be applied during the bending. In particular, this local cooling may be applied after the bending.

The local cooling may be applied to the glass during the transportation thereof before bending or after bending. The application of the local cooling may be fixed and applied to the sheet while it is traveling. This local cooling may be temporary so as to only affect one zone of the sheet. The application of the local cooling may be mobile. Specifically, the local cooling may follow the sheet during the transportation thereof, which makes it possible to carry out a longer cooling on one and the same zone without having to slow down the sheet. The local cooling may also be carried out during the bending, it being understood that it may begin before the bending and that it may continue after the bending. For the case of a local cooling during a bending against a bending form, in particular an upper bending form, the cooling system may be built into the form so that the cooling is administered by the forming face. If the bending form is heated, the local cooling may be administered by a different control of the heating at the zone to be locally cooled, or even in the absence of local heating.

After the sheet is heated in the furnace, it undergoes a general cooling. This cooling may be faster or slower. It may be a slow cooling that does not particularly generate stresses in the glass. This general cooling may include a fast cooling of the semi-tempering (also referred to as "hardening") type or of the tempering type. The local cooling according to the invention is generally administered before the application of this fast cooling. A semi-tempering or tempering treatment after bending gives the sheet a surface stress within the range extending from 20 to 200 MPa. Within the context of the invention, a general cooling of the semi-tempering type may generate a surface stress of the glass within the range extending from 20 to 90 MPa. The surface stress is influenced by the thickness of the glass. For a sheet thickness of at least 2 mm, the surface stress may be within the range extending from 30 to 90 MPa (semi-tempering). For a sheet thickness of less than 2 mm, the surface stress may be within the range extending from 20 to 50 MPa (semi-tempering). A tempering results in a surface stress of the glass of greater than 90 MPa. Generally, the surface stress of the sheet is at most 200 MPa. The surface stress may be determined by a device operating on the polariscopic principle such as the Scalp-04 polariscope, the value determined being an average of 5 measurements on one main surface of the glass substrate and at least 20 cm from the edge. The abovementioned surface stress values are absolute values, since a person skilled in the art can also express them with a negative sign.

The invention is particularly suitable for bending individual sheets having a thickness within the range extending from 0.7 to 3 mm and more particularly extending from 0.8 to 1.2 mm.

The invention also relates to a device for bending a glass sheet comprising a furnace comprising heating elements for heating the sheet to its bending temperature, a tool for individual bending of the sheet, a means for moving the sheet through the furnace and up to the bending tool, and a means for local cooling of the sheet after the heating thereof by the heating elements. In particular, the means for local cooling may be placed in order to intervene over a zone of the sheet before the bending tool or while the sheet is on or under the bending tool. For example, the bending tool may comprise an upper bending form and when the glass is under it before the bending thereof, the cooling may already be taking place. In particular, the bending tool may comprise an upper bending form and a pressing frame, these two tools being capable of being moved in order to come closer or move apart in order to bend the sheet between them. In particular, the means for local cooling may be built onto the pressing frame. The means for local cooling may also be incorporated into the upper bending form. The locally cooled zone may cover an area of between 0.5 cm$^2$ and 70 cm$^2$. In particular, the invention relates to a device for bending an individual glass sheet comprising a furnace comprising heating elements for heating the sheet individually to its bending temperature, a tool for bending the individual sheet, a means for moving the sheet individually through the furnace and up to the bending tool, and a means for local cooling of the sheet after the heating thereof by the heating elements, the locally cooled zone covering an area of between 0.5 cm$^2$ and 70 cm$^2$. Several locally cooled zones each covering an area of between 0.5 cm$^2$ and 70 cm$^2$ may be affected.

After bending, a cooling frame may be responsible for recovering the bent glass in order to take it to a cooling zone within the context of the general cooling. The means for local cooling may be built onto the cooling frame. The cooling frame may in particular pass under the upper bending form which then releases the bent glass onto it, which frame then moves away from the bending form to convey the glass to the cooling zone.

The means for local cooling is administered to the sheet by convection and/or conduction and/or radiation. In particular, it may be carried out by air blowing and the means for local cooling may comprise an air blowing nozzle.

According to the invention, the individual sheets travel one behind the other individually through the furnace and up to the bending tool owing to the moving means. The means for moving the sheet may comprise a roller bed. After bending, the individual sheets are conveyed one behind the other into a cooling zone. This cooling generally comprises a rapid cooling of the semi-tempering or tempering type, followed by a slower general cooling. Thus, the device according to the invention may comprise, after the bending tool along the path of the sheet, a unit for blowing air that can administer a semi-tempering or a tempering to the sheet.

The invention also relates to a process for manufacturing a bent glazing comprising a glass sheet comprising a peripheral compression belt comprising the preparation of the glass sheet by the bending and cooling process according to the invention, followed by cutting in the locally cooled zone. The invention relates in particular to a process for manufacturing a bent glazing comprising a glass sheet comprising a peripheral compression belt, said process comprising the manufacture of a bent individual glass sheet comprising a peripheral compression belt, said manufacture comprising the heating of the glass sheet to its bending temperature in a furnace, the individual bending thereof, and the general cooling thereof, one zone of the sheet at least partially inside said peripheral compression belt, referred to as locally cooled zone, undergoing, after the heating of the sheet, a local cooling faster than the general cooling, when the sheet is at a temperature of at least 530° C., followed by the cutting of the sheet in the locally cooled zone. In this process, the sheet is individual (not juxtaposed with another sheet) from the heating in the furnace until at least the end of the local cooling.

The invention also relates to a line for manufacturing a bent glazing comprising a glass sheet, said line comprising the device according to the invention and a means for cutting the bent glass sheet, i.e. individually or after assembly in a laminated glazing.

The invention can be applied to the production of:
an antenna hole,
a roof bar hole,
a wiper arm hole,
a hole for integration of an electronic (lighting, GPS, etc.) element,
a retaining (hinge, support) hole,
reinforcement for local lamination of an element (LED, OLED, electronic component, structural elements, etc.),
reinforcement for local mechanical stress of a system (attachment point, bearing point).

The invention can be applied to all vehicle (motor vehicle, bus, truck, train, agricultural vehicle) glazings and any type of glazing of these vehicles such as windshield, rear window, side windows, quarter windows, roofs, bayflush and others.

The invention can also be applied to glazings in the building, solar, specialty applications and aeronautic fields.

Figure 1:
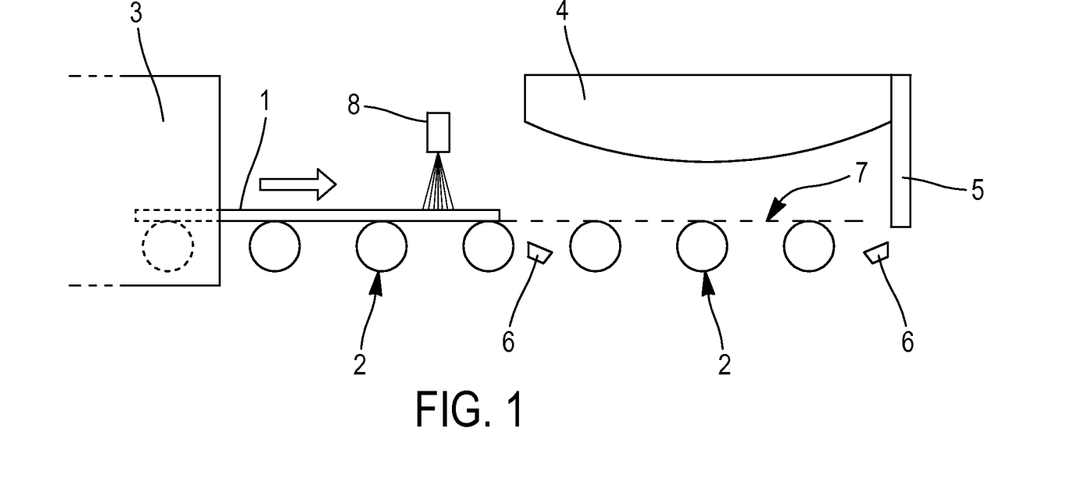

FIG. 1 represents a device for bending individual glass sheets 1 traveling one behind the other on a roller bed 2. The roller bed passes through a furnace 3 that heats each flat sheet to its plastic deformation temperature. The sheet leaves the furnace and then arrives under a convex upper bending form 4. The sheet is stopped at an appropriate position under the upper bending form by means of a system of end stops 5. Once the sheet has been taken charge of by the upper bending form, the end stop may optionally be retracted. A lower bending counterform 6 of the pressing frame type is in a bottom position below the surface for receiving the sheet as indicated by the virtual line 7. A local cooling air jet is provided by the nozzle buse 8 onto the upper face of the sheet and over a limited zone, referred to as the locally cooled zone, in order to bring this zone to a temperature lower than the rest of the sheet. The nozzle 8, acting as local cooling means, may blow for a short time in order to impact a small zone, or a longer time so that the size of the zone impacted by the local cooling is enlarged owing to the movement of the sheet during the blowing. A temperature difference will continue to be present during the bending and after the bending during the general cooling of the sheet, producing particular stresses in the zone locally cooled by the nozzle 8.

Figure 2:
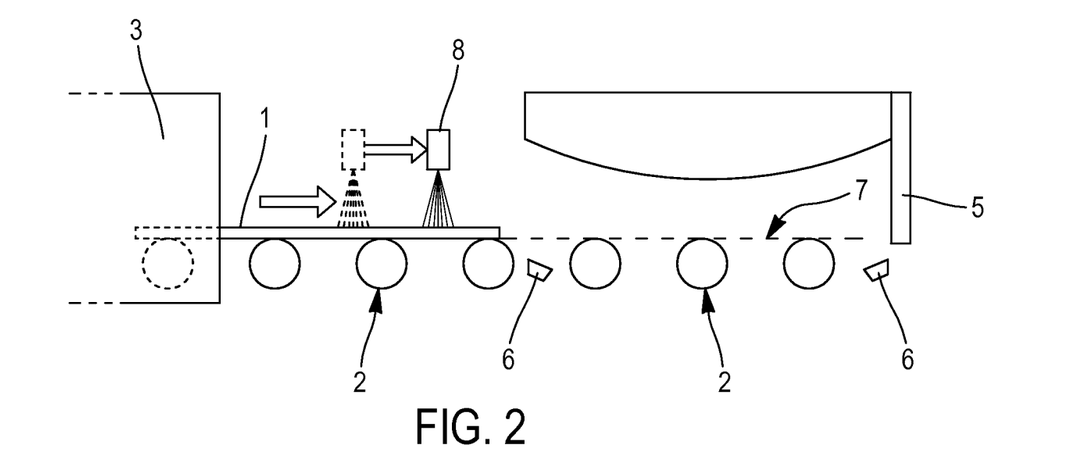

FIG. 2 represents the same device as the one from FIG. 1 except that the nozzle 8 moves while the sheet 1 is moving (the arrows depict the movements). The initial position of the nozzle is represented by dotted lines. The nozzle 8 may move at the same speed as the sheet or at a different speed, generally slower than the speed of the sheet. This embodiment makes it possible to cool the same zone of the sheet for longer without having to slow down the sheet.

Figure 3:
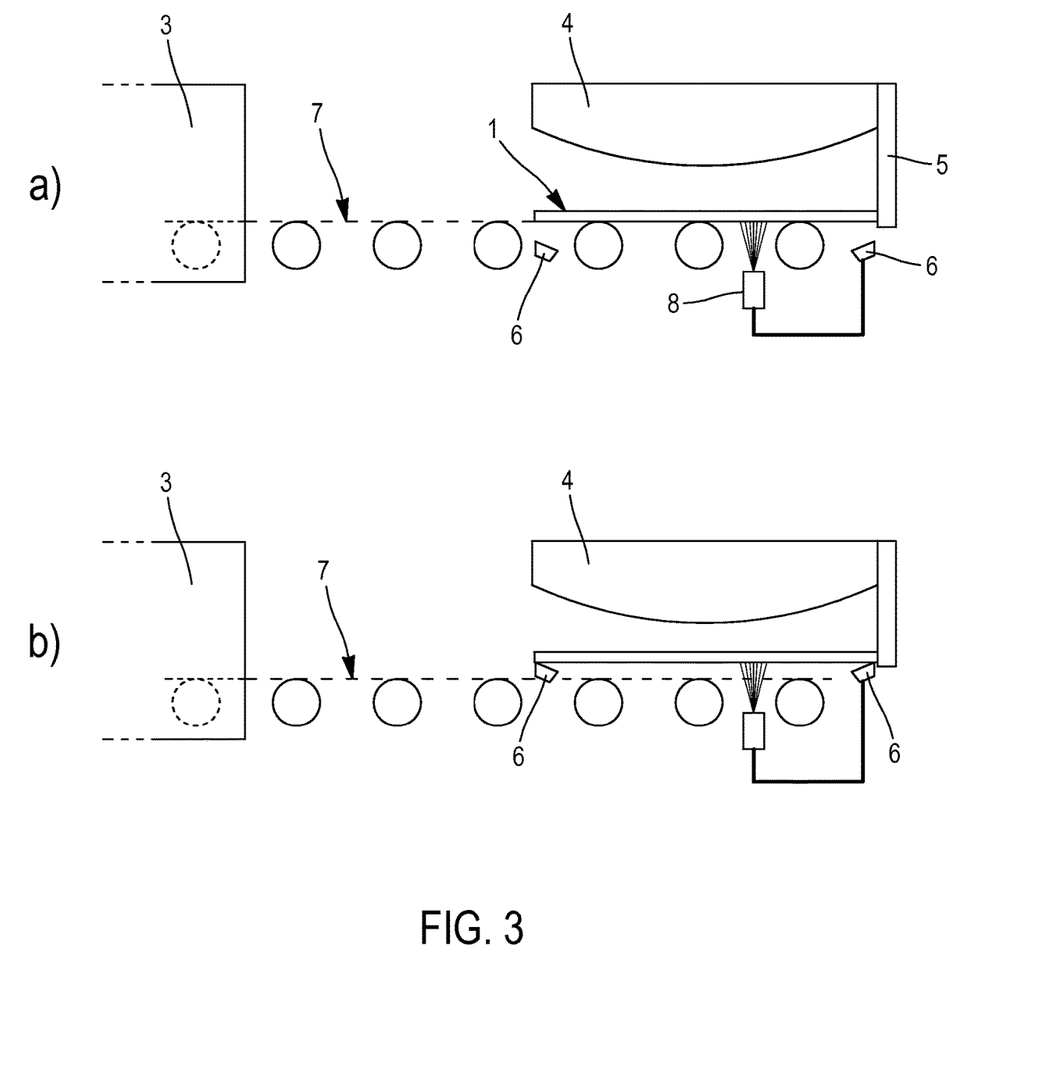

FIG. 3 represents the same device as the one from FIG. 1 except that the nozzle 8, acting as local cooling means, blows onto the lower face of the sheet when the latter is stopped in the bending position under the upper bending form 4. The nozzle here is built onto (i.e. attached to) the lower counterform 6 of the pressing frame. It can therefore blow as soon as the sheet is present above it (FIG. 3a) and while the sheet rises toward the upper bending form 4 (FIG. 3b), said sheet then being supported by the lower counterform 6 of the pressing frame.

Figure 4:
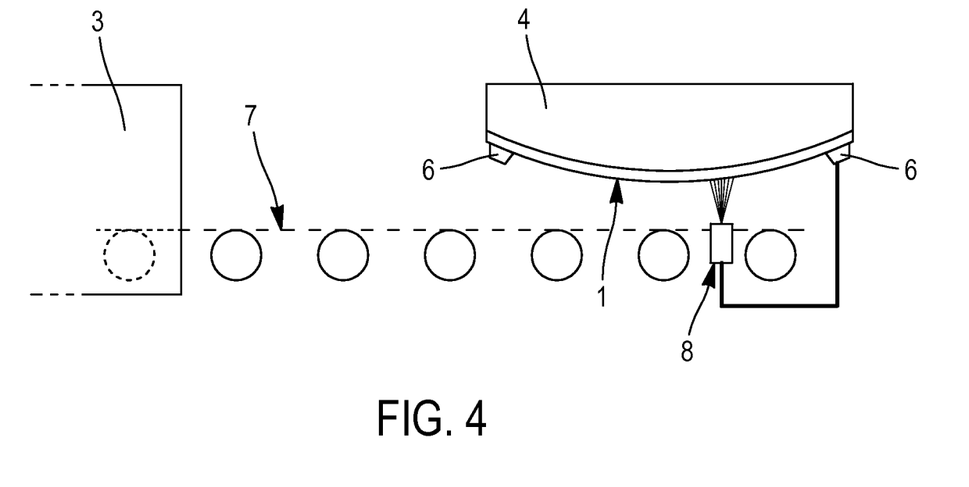

FIG. 4 represents the same device as the one from FIG. 3 but that intervenes at a later stage, during the bending of the sheet 1. While the sheet 1 is pressed between the lower counterform 6 (pressing frame) and the upper bending form 4 and is therefore in the process of bending, the nozzle 8 blows cooling air onto a local zone of the lower face of the sheet. The nozzle 8 acts as local cooling means.

Figure 5:
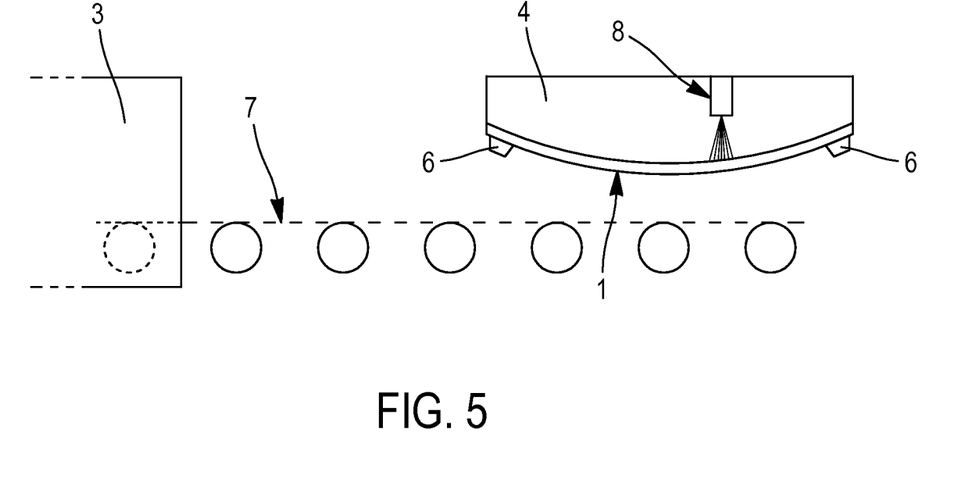

FIG. 5 represents the same device as the one from FIG. 4 except that the blowing nozzle 8 is incorporated into the upper bending form 4. The cooling air is blown while the sheet is pressed against the form 4. The form may comprise an orifice so that the cooling air can come directly in contact with the local zone of the upper face of the sheet. Of course, the blown air is channeled to the sheet then discharged from the bending form by a pipe (not represented) in the bending form.

Figure 6:
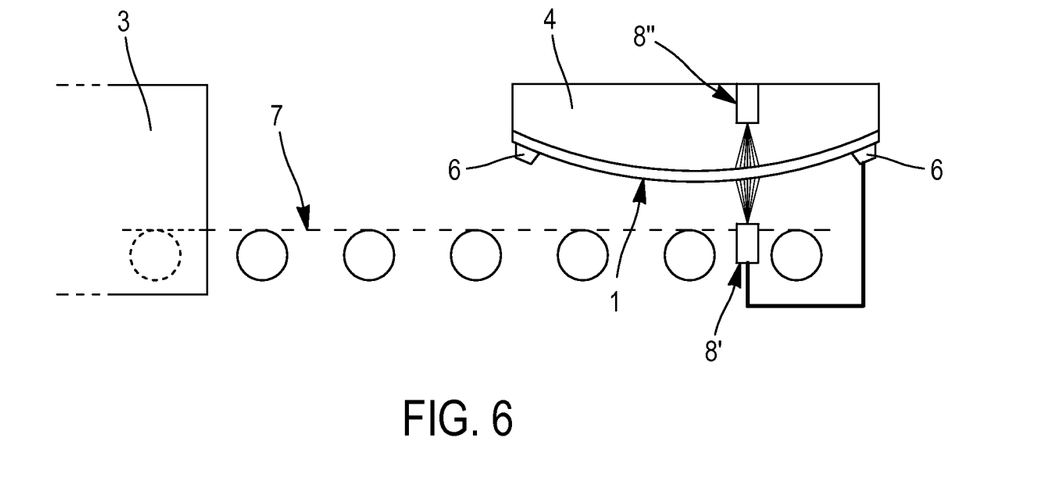

FIG. 6 represents a device combining the local cooling systems of FIGS. 4 and 5. Here, two nozzles 8' and 8" blow at the same time against the sheet, on either side thereof and generally at the same location, i.e. opposite on the same zone on either side of the sheet. In this way the local cooling is more intense. The nozzles 8' and 8" act as local cooling means.

Figure 7:
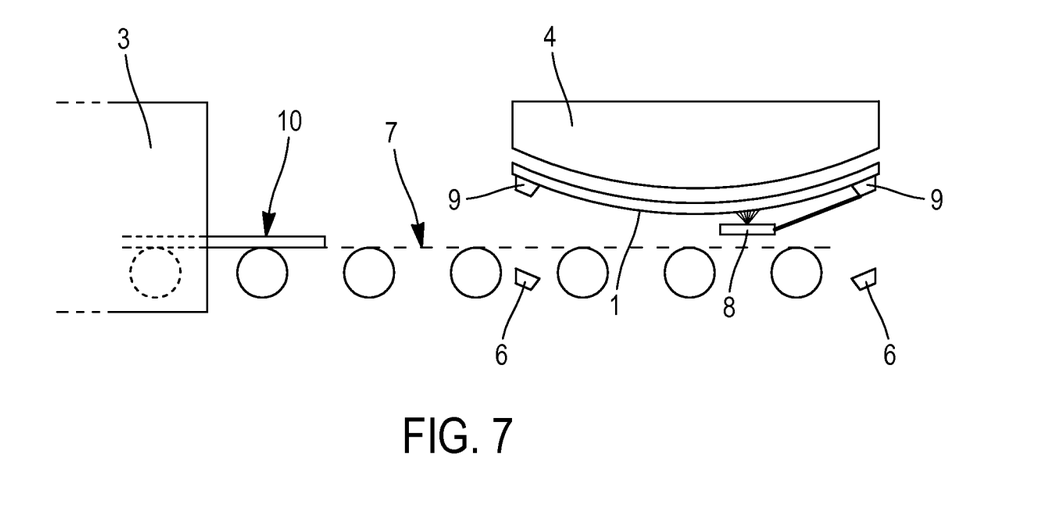

FIG. 7 represents a device according to the invention in which the localized cooling is carried out just after the bending. After bending against the upper form 4, the lower counterform 6 of the pressing frame is dropped back down below the surface 7 for receiving the glass. The glass is then held against the upper form 4 owing to a suction system through its face in contact with the glass. A cooling frame 9 has passed under the form 4 then the form 4 has released the glass onto the cooling frame 9 by shutdown of the suction. A blowing nozzle 8, acting as local cooling means, is attached to the cooling frame and may blow cooling air locally onto the glass as soon as the cooling frame 9 is under the glass. The nozzle 8 may blow when the glass is separated from the form 4 and when the glass is moved away from the form 4 by the cooling frame 9 to go to a cooling zone. A sheet 10 approaches it on leaving the furnace 3 in order to undergo the same treatment as the glass 1 after the latter.

Figure 8:
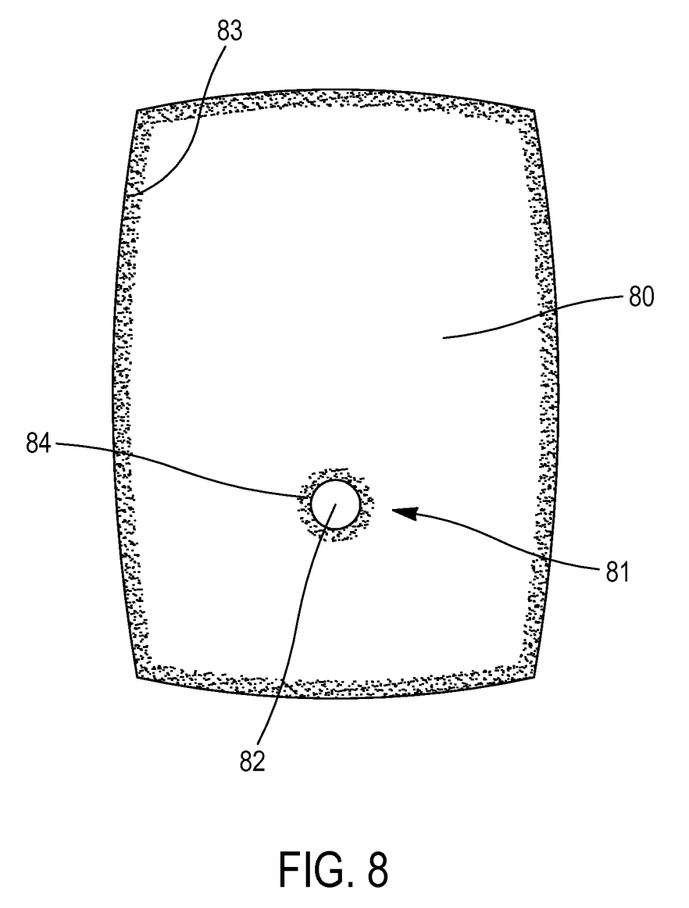

FIG. 8 represents a bent motor vehicle roof made of laminated glass 80 comprising an orifice 81 for an antenna. The laminate combines two glass sheets bent according to the invention, the zone for the antenna having been locally cooled according to the invention for each of the two sheets. The orifice 82 was made after assembly of the laminate in a single drilling operation. The grey zones represent the zones comprising edge compressive stresses. The periphery of the glazing comprises a belt of compressive stresses 83 which is produced naturally after bending during the cooling, without it being necessary to blow on it. The edge of the orifice 82 also comprises edge compressive stresses 84 which were produced owing to the local blowing according to the invention. The orifice 82 is in the region of the sheet inside the compression belt.

The invention claimed is:

1. A device for bending an individual glass sheet comprising:
 a furnace comprising heating elements for heating the individual glass sheet to its bending temperature, said individual glass sheet being an unbent individual glass sheet;
 a bending tool for bending the unbent individual glass sheet heated to its bending temperature in said furnace, the bending tool including an upper bending form and a movable lower bending counterform, the movable lower bending counterform configured to press the unbent individual glass sheet heated to its bending temperature in said furnace against the upper bending form to form a bent individual glass sheet, the upper bending form and movable lower bending counterform being dimensioned so that, at the bending tool, a peripheral area of the unbend individual glass sheet is pressed against a main surface of the upper bending form to transform said unbent individual glass sheet into said bent individual glass sheet;
 a conveyor configured to move the unbent individual glass sheet through the furnace and to the bending tool so that the unbent individual glass sheet is positioned by said conveyor at a pickup location at said bending tool that is between the upper bending form and the movable lower bending counterform, wherein said movable lower bending counterform is movable between a position below said pickup location to a position above said pick up location to pick up said unbent individual glass sheet and move said unbent individual glass sheet towards the upper bending form;

a movable cooling frame that is movable between the upper bending form and the movable lower bending counterform to receive the bent individual glass sheet from the upper bending form, an air blowing unit arranged in a cooling zone that is downstream of the bending tool and that is adapted to administer a general cooling of the entire individual bent glass sheet so as to semi-temper or temper the individual bent glass sheet, and a local cooling system for local cooling of only a portion of the unbent or bent individual glass sheet after the unbent or bent individual glass sheet is heated by the heating elements to a bending temperature to introduce a temperature differential between said portion of the unbent or bent individual glass sheet that is locally cooled and a remaining portion of the unbent or bent individual glass sheet when said unbent or bent individual glass sheet is above a temperature at which the glass of the unbent or bent glass sheet sets, the local cooling system being arranged downstream of the heating elements and movable at a position that is upstream of the cooling zone such that the local cooling of only said portion of the unbent or bent individual glass sheet is carried out by the local cooling system prior to (i) conveying the individual glass bent glass sheet into the cooling zone and (ii) administering by the air blowing the general cooling of the individual bent glass sheet to semi-temper or temmper the individual bent glass sheet, wherein
(a) the local cooling system includes a first cooling tool that is movable with the movable lower bending counterform such that the first cooling tool and the movable lower bending counterform arre movable vertically from the position below said pickup location towards the upper bending form during which the movable lower bending counterform picks up the unbent individual glass sheet at said pickup location and vertically transports the unbent individual glass sheet above the pickup location towards the upper bending form to bend the unbent individual glass sheet and form the bent individual glass sheet, the first cooling tool forming a first local cooling zone covering an area of between 0.5 cm$^2$ and 70 cm$^2$ on a first main face of the unbent or bent individual glass sheet, or (b) the local cooling system includes a second cooling tool that is incorporated in the upper bending form, the second cooling tool forming a second local cooling zone covering an area of between 0.5 cm$^2$ and 70 cm$^2$ on a second main face of the individual glass sheet that is opposite the first main face, or (c) the local cooling system includes said first and second cooling tools, or wherein the local cooling system includes said first and second cooling tools, or wherein the local cooling system includes a third cooling tool that is movable with the movable cooling frame between the upper bending form and the movable lower bending counterform, the third cooling tool forming a third local cooling zone covering an area of between 0.5 cm$^2$ and 70 cm$^2$ on the first main face of the individual glass sheet, wherein the local cooling system is constructed and arrange to locally cool said portion of the unbent or bent individual glass sheet in a zone that extends outside a peripheral zone of the glass sheet that includes a peripheral compression belt.

2. The device as claimed in claim 1, wherein the local cooling system for a local cooling is placed in order to intervene over a zone of the glass sheet while the glass sheet is on or under the bending tool.

3. The device as claimed in claim 1, wherein the local cooling system includes said first cooling tool and the first cooling tool is attached to said movable lower bending counterform.

4. The device as claimed in claim 1, wherein the local cooling system includes only said second cooling tool.

5. The device as claimed in claim 1, wherein the local cooling system includes said third cooling tool, the third cooling tool being attached to said cooling frame.

6. The device as claimed in claim 1, wherein the first, second and third cooling tools act by convection and/or conduction and/or radiation.

7. The device as claimed in claim 6, wherein at least one of the first, second and third cooling tool comprises an air blowing nozzle.

8. The device as claimed in claim 1, wherein the conveyor for moving the unbent individual glass sheet comprises a roller bed.

9. The device as claimed in claim 1, wherein the bending tool is located downstream of the heating elements so that the unbent individual glass sheet is bent at the bending station after being exposed to the heating elements.

10. A line for manufacturing a bent glazing comprising an individual glass sheet, said line comprising the device from claim 1 and a cutting tool for cutting the bent individual glass sheet.

11. the device as claimed in claim 1, wherein the local cooling system includes only said first and second cooling tools.

12. The device as claimed in claim 1, wherein the local cooling system is configured to carry out said local cooling by conduction and/or radiation.

* * * * *